United States Patent [19]

van der Lely et al.

[11] 4,412,588
[45] Nov. 1, 1983

[54] SOIL CULTIVATING IMPLEMENTS

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 296,815

[22] Filed: Aug. 27, 1981

[30] Foreign Application Priority Data

Aug. 29, 1980 [NL] Netherlands .................. 8004888

[51] Int. Cl.³ .................. A01B 33/06; A01B 29/04
[52] U.S. Cl. .................. 172/68; 172/547; 172/554
[58] Field of Search .................. 172/68, 69, 532, 540, 172/547, 548, 549, 551, 554

[56] References Cited

U.S. PATENT DOCUMENTS

| 1,499,245 | 6/1924 | Nygard | 172/548 X |
|---|---|---|---|
| 1,532,986 | 4/1925 | Branson | 172/551 |
| 2,664,040 | 12/1953 | Beard | 172/548 |
| 3,194,194 | 7/1965 | Phelps | 172/69 X |
| 3,203,487 | 8/1965 | Whitesides | 172/551 X |
| 4,003,438 | 1/1977 | Lely | 172/68 X |
| 4,051,904 | 10/1977 | Lely et al. | 172/68 X |

FOREIGN PATENT DOCUMENTS

| 1251567 | 10/1967 | Fed. Rep. of Germany | 172/554 |
|---|---|---|---|
| 1111512 | 11/1955 | France | 172/548 |
| 7613474 | 6/1978 | Netherlands | |
| 23815 | 4/1907 | Sweden | 172/540 |
| 32090 | 9/1909 | Sweden | 172/549 |
| 29498 | 12/1909 | Sweden | 172/540 |
| 578917 | 11/1977 | U.S.S.R. | 172/540 |

*Primary Examiner*—Paul E. Shapiro
*Attorney, Agent, or Firm*—Penrose L. Albright

[57] ABSTRACT

A soil cultivating implement comprising soil working members having tines, the members being arranged in a row that extends transverse to the direction of travel. A ground roller is freely rotatable and positioned to the rear of the row of soil working members. In order for the roller to support the implement on the ground and regulate the maximum depth of penetration of the soil working members into the ground, the roller has crowns or assemblies of projections which comprise substantially radial portions and outer end portions which are bent over laterally in opposite directions by significant angles and also rearwardly with respect to the direction of normal roller rotation. In addition, they are widened towards the end in the direction of their rotational movement. Scraping members are positioned between the successive assemblies or crowns of projections and the roller may have a central tubular shaft or carrier of a different diameter.

15 Claims, 7 Drawing Figures

SOIL CULTIVATING IMPLEMENTS

SUMMARY OF THE INVENTION

This invention relates to soil cultivating implements or machines of the kind which comprise a plurality of power-drivable soil working members and a ground roller that is disposed behind the soil working members with respect to the intended direction of operative traval of the implement or machine in such a way as to be bodily displaceable to, and of being retained in, a selected one of a number of different positions relative to a mobile frame of the implement or machine, the roller comprising a plurality of more or less radial projections of rod or bar formation which projections are bent, over, adjacent their outer ends. "Implement or machine" will be shortened to "implement" or, in the plural, "implements" throughout the remainder of this document for the sake of brevity.

The ground rollers of known implements of the kind set forth have their projections bent over adjacent their outer ends in planes which are perpendicular or substantially perpendicular to the longitudinal axis, that is the axis of rotation, of the roller but this arrangement detracts from the ability of the roller to support the implement adequately on the ground surface and its capacity to determine the working depth attainable by its soil working members by bodily displacement of the roller as discussed above.

It is an object of the present invention to overcome, or at least significantly to reduce, the stated shortcomings of the ground rollers of implements of the kind set forth and, accordingly, the present invention provides a soil cultivating implement of the kind set forth, wherein the outer ends of said projections are bent over laterally so as to have significant inclinations to planes which are perpendicular to the longitudinal axis, or the axis of rotation, of the ground roller.

For a better understanding of the invention, and to show how the same may be carried into effect, reference will now be made, by way of example, to the accompanying drawings, in which:

DESCRIPTION OF THE PREFERRED EMBODIMENTS

Figure 1:
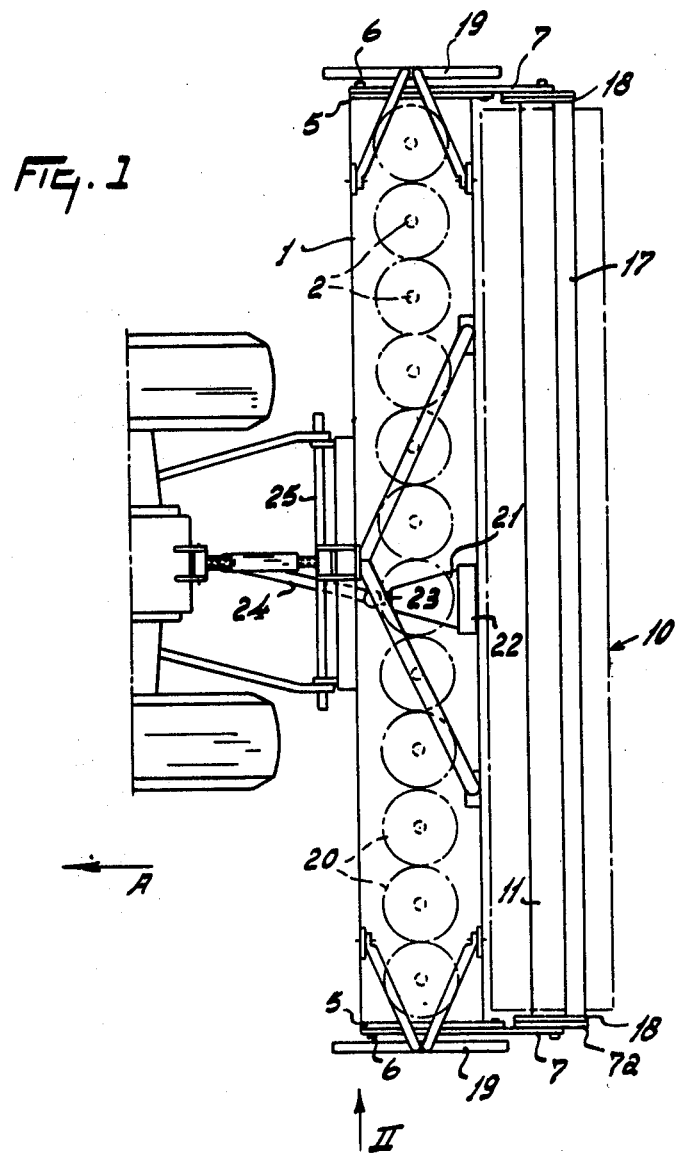
FIG. 1 is a plan view of a soil cultivating implement in accordance with the invention shown connected to the rear of an agricultural tractor.
Figure 2:
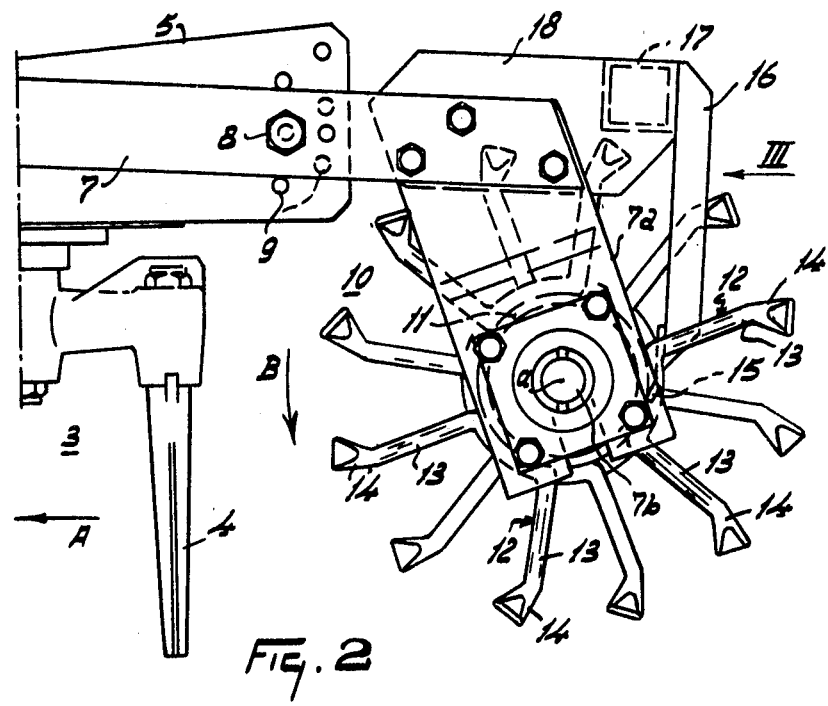
FIG. 2 is a side elevation, to an enlarged scale, of rear parts of the implement of FIG. 1 as seen in the direction indicated by an arrow II in that Figure.

Referring firstly to FIGS. 1 to 5 of the accompanying drawings, and particularly to FIG. 1 thereof, the soil cultivating implement which is illustrated is in the form of a rotary harrow having a hollow box-section frame portion 1 that extends substantially horizontally transverse, and usually (as illustrated) substantially horizontally perpendicular, to the intended direction of operative travel of the implement that is indicated in FIGS. 1 and 2 of the drawings by an arrow A. A plurality, of which there are twelve in the illustrated embodiment, of substantially vertical, or at least upwardly extending, shafts 2 are rotatably journalled in bearings carried by the walls of the frame portion 1 in such a way that said shafts lie parallel to one another in a single row which is parallel to the transverse length of the frame portion 1 and in which row the shafts 2 are spaced apart from one another at regular intervals which intervals are conveniently, but not essentially such that the longitudinal axis or axis of rotation of each shaft 2 is spaced from the axis of each neighboring shaft 2 by a distance of substantially twenty-five centimeters. Each shaft 2 projects downwardly beneath the bottom of the hollow frame portion 1 and is there firmly but releasably provided with a corresponding soil working member 3 (FIG. 2). Each soil working member 3 comprises a pair of diametrically opposed rigid soil working tines 4 and is, of course, rotatable with the corresponding shaft 2 to which it is secured. Thus, during the use of the implement, each soil working member 3 will revolve in the opposite direction to that of each of its immediate neighbors, the effective distance between the two tines 4 of each member 3 being a little greater than is the regular spacing between the longitudinal axes or axes of rotation of the successive shafts 2 so that the strips of land which the individual members 3 cultivate during the use of the implement overlap one another to produce a single broad strip of worked soil which, in the case of the example that is being described, will have a width of substantially three meters.

The opposite ends of the hollow box-section frame portion 1 are closed by corresponding end plates 5 that are substantially vertically parallel to one another. Each plate 5 is substantially sector-shaped having a greater vertical extent at its rear (with respect to the direction A) than it does at the front. Arms 7 are turnable upwardly and downwardly alongside the two end plates 5 about a substantially horizontal axis that is defined by two stub shafts 6 which project outwardly relative to the end plates 5 at locations which are close to the leading extremities of those end plates 5 as considered in the direction A. The upwardly and downwardly displaceable arms 7 project rearwardly beyond the end plates 5 by some distance and each arm 7 is formed with at least one, and preferably two, holes, any one of which can be brought into register with a selected one of several holes 9 formed in a rear end region of the corresponding plate 5 by upward or downward displacement of the arm 7 relative to the adjoining plate 5. Bolts 8 are provided for entry through selected registering holes in the arms 7 and end plates 5 and, when tightened, said bolts 8 will firmly and reliably maintain the arms 7 in preferred angular positions about the axis defined by the stub shafts 6 relative to the frame portion 1.

Figure 3:
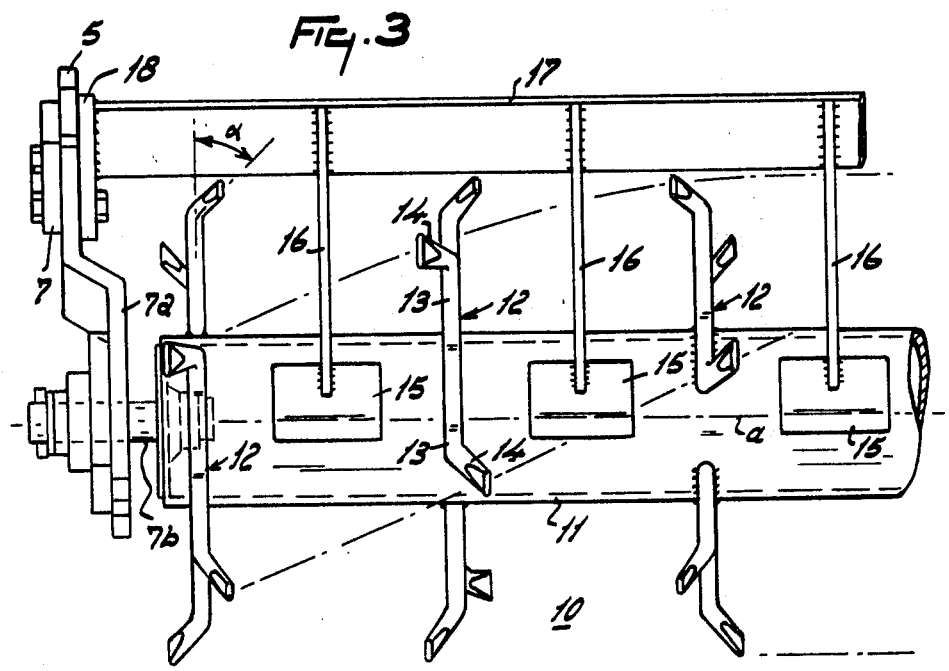
FIG. 3 is a rear elevation of parts at one end of the implement to the same scale as FIG. 2 and as seen in the direction indicated by an arrow III in that Figure.
Figure 4:
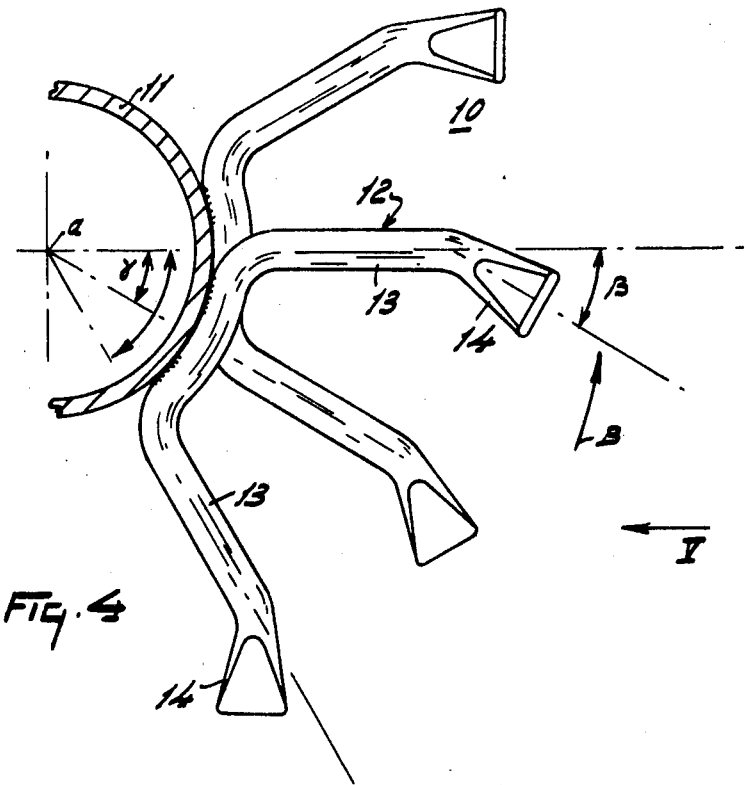
FIG. 4 is a sectional view, to a further enlarged scale and again as seen in the direction indicated by the arrow II in FIG. 1, showing the construction of a ground roller of the implement in greater detail.
Figure 5:
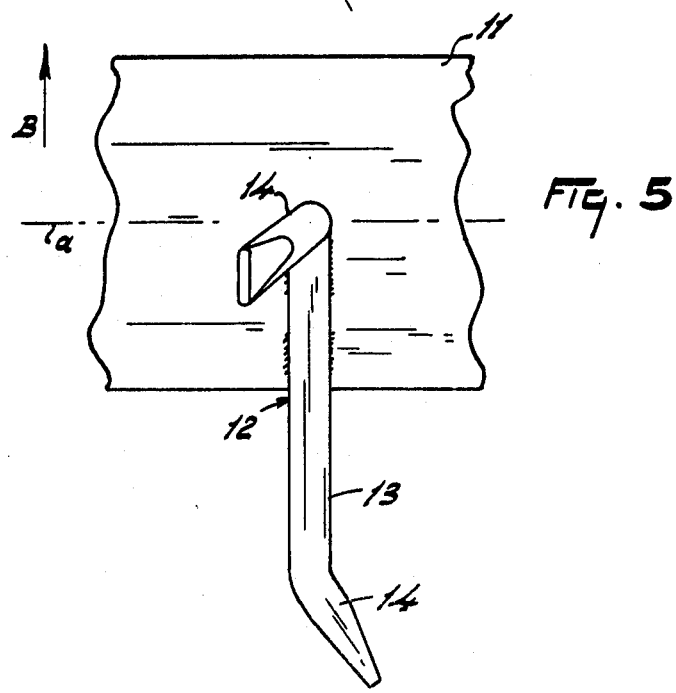
FIG. 5 is a view as seen in the direction indicated by an arrow V in FIG. 4.

A ground roller that is generally indicated by the reference 10 is mounted by stub shafts 7b in a freely rotatable manner between horizontally aligned bearings that are carried by downwardly and rearwardly projecting plates 7a fastened on the rearmost ends of the two arms 7 (see FIGS. 2 and 3). The ground roller 10 comprises a central horizontally extending tubular shaft or carrier 11 of circular cross-section having a longitudinal axis a which is also the axis of rotation of the roller 10 itself. The shaft of carrier 11 supports, at regularly spaced apart intervals along its axial length, assemblies or crowns 12 of projections that are of rod or bar formation. Each assembly or crown 12 comprises six rods or bars that are formed in three internal pairs and that are so arranged that the rods or bars project outwardly from the curved surface of the tubular shaft or carrier 11 in a single plane and at 60° intervals around the axis a. The two rods or bars of each integral pair are formed from a single length of material, which will usually be steel, said integral pair being of approximately, but not exactly, U-shape with the two limbs of the "U" inclined to one another at an angle of 60°. As can be seen best in FIG. 4 of the drawings, the web or base of each "U" is shaped to conform to the curved surface of the shaft or carrier 11 and is securely welded to that curved surface. Each projection, which is afforded by one limb of one of the U-shaped integral pairs, has an inner portion 13 which extends radially with respect to the axis a, said portion 13 terminating in an outer bent-over end portion 14. Each end portion 14 is bent over laterally from a plane which contains the longitudinal axes of the six inner portions 13 that correspond to one assembly or crown 12 so as to have a significant inclination to that plane which inclination (angle α) may be as large as 50° but it is preferred should have a magnitude of substantially 45°. The two end portions 14 which correspond to each integral pair of projections are bent over laterally in opposite directions. In addition to being bent over laterally, each end portion 14 is also bent over rearwardly relative to the intended direction of operative rotation B of the roller 10 as is best illustrated in FIG. 4 of the drawings (angle β). Each end portion 14 is flattened throughout at least the greater part of its length in such a way that its width increases towards the blunt free end thereof. It will be apparent from the drawings that, in order that said end portions 14 shall all be bent over rearwardly relative to the intended direction of operation rotation B of the roller 10, each approximately U-shaped integral assembly is asymmetrical as regards the two end portions 14 concerned. Each end portion 14 has an axial length which is substantially one-quarter of the total length of the projection of which is forms a part.

The integral pairs of rods or bars have their webs or bases welded to the curved surface of the shaft or carrier 11 in such positions that, when viewed lengthwise of the axis a (FIG. 4), each projection will be midway between the two projections of one integral pair in the assembly or crown 12 concerned, this relationship being particularly evident from a study of FIGS. 3 and 4 of the drawings. Moreover, this staggered disposition of the assemblies or crowns 12 around the axis a has the result that the free ends or tips of the portions 14 are disposed along imaginary helical lines as illustrated in FIG. 3 of the drawings for only two of those imaginary helical lines. Each imaginary helical line interconnects portions 14 which are all bent over laterally in only one of the two possible directions.

A number of scraping members 15 are provided and are disposed between the successive assemblies or crowns 12 of projections. Each scrapping member 15 has an edge which bears against the curved surface of the tubular shaft or carrier 11 at a substantially rearmost location on that shaft or carrier 11 relative to the direction A (see FIG. 2), each scraping member 15 being fastened to a corresponding arm 16. The arms 16 are, in turn, secured to a square cross-section beam 17 that is parallel or substantially parallel to the axis a, the opposite ends of the beam 17 being welded to corresponding plates 18 having shapes which can be seen best in the side elevation of FIG. 2 of the drawings.

Two substantially vertically disposed shield plates 19 are located immediately beyond the opposite ends of the row of rotary soil working members 3 and co-operate with the end members 3 of that row in working the soil when the implement is in operation. Said plates 19 minimize ridging of the soil at the opposite edges of the broad strip of ground which is worked by the implement and substantially prevent stones and other hard objects from being flung laterally of the path of travel of the implement, when it is in operation, so as to shield operatives, bystanders, livestock and property from possible injury or damage attributable to this cause. It will be seen from FIG. 1 of the drawings that each shield plate 19 is connected by a pair of arms and a pair of horizontal pivots that are aligned in substantially the direction A to anchorages on the top of the hollow frame portion 1 so that, during operation, the lower edges of the plates 19, which slide over the ground surface, can move upwardly and downwardly to enable the plates 19 to match undulations in the surface of the land that is being worked. When the implement is not in use when it or is being transported, the shield plates 19 and the arms which carry them can be turned upwardly and inwardly through substantially 180° about their pivotal connections to the top of the hollow frame portion 1.

Each shaft 2 is provided, inside the hollow frame portion 1, with a corresponding straight-toothed or spur-toothed pinion 20, the twelve pinions 20 (in this embodiment) being in successively meshing engagement with one another to produce the previously mentioned contra-rotating arrangement of immediately neighboring soil working members 3. On shaft 2 of the center pair of those shafts in the single row thereof has an upward extension through the top of the hollow frame portion 1 into a gear box 21 in which shafts and pinions place it in connection with a rotary input shaft 23 of said gear box, the leading end of which projects forwards in substantially the direction A from the front of the gear box. The transmission between the upward extension of the shaft 2 which has just been mentioned and the rotary input shaft 23 includes a change-speed gear 22, located at the rear of the gear box 21. Gear 22 will not be described in detail since it does not form the subject of the present invention. Suffice it to say that said gear 22 comprises a plurality of pairs of intermeshing toothed pinions of different sizes, a selected pair being engageable upon the splined ends of two parallel shafts to provide a corresponding transmission ratio between those shafts. Thus, depending upon the particular pair of intermeshing pinions which is selected, and their arrangement said shaft ends, the rotary soil working members 3 will be driven at a faster or slower rate, when the implement is in use, without having to change the speed of the initiating drive that is usually derived from the rear power take-off shaft of an agricultural tractor.

FIG. 1 of the drawings diagrammatically shows the rear of an agricultural tractor and a telescopic transmission shaft 24, which is of a construction which is known per se, rotatably interconnecting such a rear power take-off shaft and the forwardly projecting splined or otherwise keyed end of the rotary input shaft 23 of the gear box 21. The telescopic transmission shaft 24 has universal joints at its opposite ends.

The front of the frame portion 1, with respect to the direction A, is provided with a coupling member or trestle 25 that is illustrated only diagrammatically in FIG. 1 of the drawings but which is of substantially triangular configuration as viewed in either front or rear elevation. This coupling member or trestle 25 is employed, in a manner that is known per se, in connecting the implement to the rear-mounted three-point lifting device or hitch of a tractor or other operating vehicle, such as the agricultural tractor which is illustrated in FIG. 1.

In the use of the soil cultivating implement that has been described, its coupling member or trestle 25 is connected to the three-point lifting device or hitch at the rear of an agricultural tractor or other operating vehicle and the leading splined or otherwise keyed end of the rotary input shaft 23 is placed in driven connection with the rear power take-off shaft of the same tractor or other operating vehicle through the intermediary of the known telescopic transmission shaft 24 having universal joints at its opposite ends. Adjustments which may be made, if necessary, before work commences include setting the speed of rotation of the soil working members 3 in response to a substantially fixed speed of rotation applied to the rotary input shaft 23 by an appropriate selection of the transmission ratio in the change-speed gear 22 and setting the maximum depth to which the tines 4 of the members 3 will be able to penetrate into the ground by moving the roller 10 bodily either upwards or downwards by temporarily removing the bolts 8, turning the arms 7 downwards or upwards, as may be required, about the stub shafts 6 to bring one of the holes in each arm 7 into register with a fresh hole 9 in the neighboring end plate 5, and finally replacing and tightening the bolts 8. As the tractor and implement combination make operative progress in the direction A, the end portions 14 of the roller projections 12 penetrate into the soil to some extent but, because the total area of those end portions 14 that is in contact with the ground surface at any time is relatively large, the penetration is not deep and the roller 10 can therefore satisfactorily support the implement on the ground surface, even when the soil is in a wet condition, and will perform its adjustable depth control function for the tines 4 of the soil working members 3 in an entirely adequate manner. Because of the relatively large area of contact between the end portions 14 and the ground surface, those end portions 14 themselves effect a secondary crumbling action and gently consolidate the soil worked by the foregoing members 3. The roller 10 thus also functions as a secondary soil working member.

The scraping members 15 that are arrayed between the rods or bars ensure that no soil remains stuck between those pins or bars. The use of the roller 10 that has been described usually ensures that, even on heavy soil in a wet condition, little, if any, earth will adhere to the roller 10 for any significant length of time while, because of the formation and disposition of the assemblies or crowns 12 of projections that has been described, the roller 10 still has a relatively large supporting surface in contact with the ground thus enabling said roller to support the implement satisfactorily during operation and, by bodily displacement in the manner that has been described, to control the maximum depth to which the tines 4 of the soil working members 3 can penetrate into the ground in an entirely adequate manner.

Figure 6:
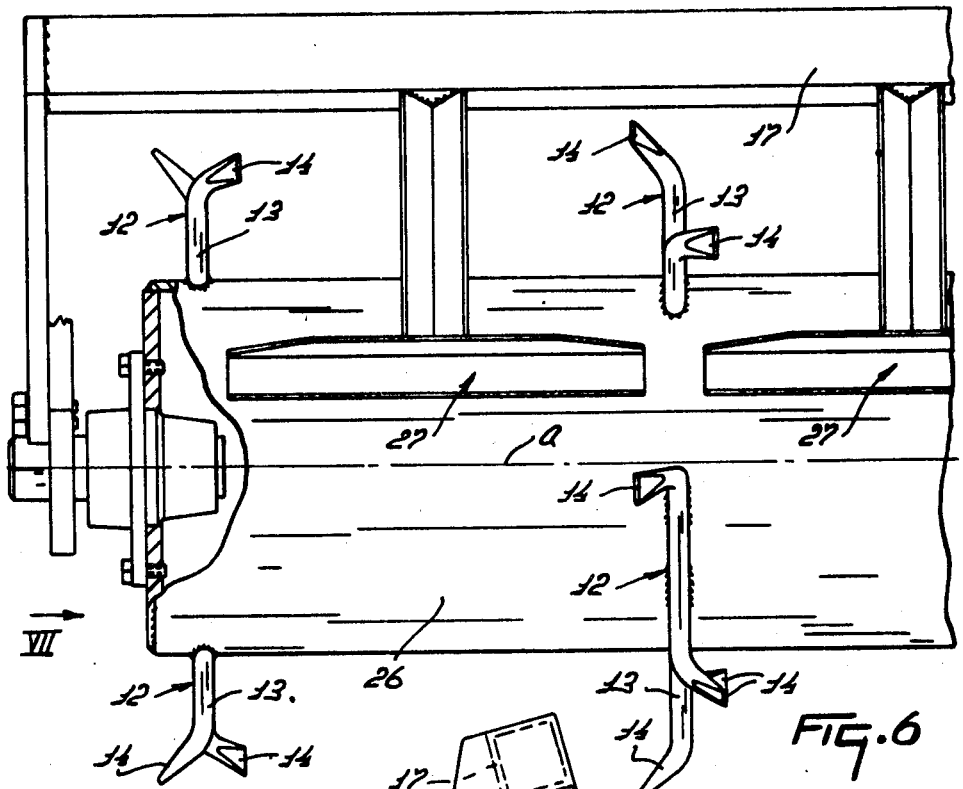
FIG. 6 illustrates an alternative embodiment and is a part-sectional view substantially corresponding to FIG. 3 in the embodiment of FIGS. 1 to 5.
Figure 7:
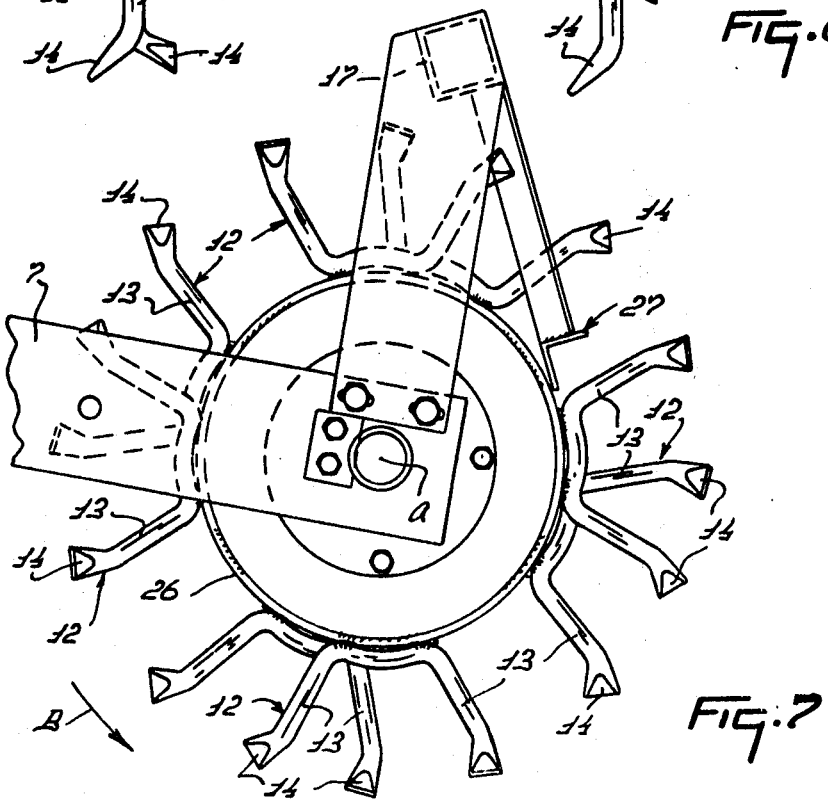
FIG. 7 is a side elevation as seen in the direction indicated by an arrow VII in FIG. 6.

FIGS. 6 and 7 of the drawings illustrate an alternative construction of the roller and of the scraping members but many of the parts that are illustrated in those Figures are either identical, or very similar, to parts that have already been described above. Accordingly, such parts will not be described in detail again and are indicated in FIGS. 6 and 7 of the drawings by the same reference numerals as are used for the analogous parts in FIGS. 1 to 5 of the drawings. In this embodiment, the ground roller comprises a tubular shaft or carrier 26 to the outer curved surface of which assemblies or crowns 12 of the previously described projections of rod shaped or bar shaped formation are welded, each projection having a laterally bent-over outer end 14 as already described above with reference to FIGS. 1 to 5 of the drawings. However, it will be noted from the drawings that the tubular shaft or carrier 26 is of considerably greater diameter than is the previously described tubular shaft or carrier 11. Each assembly or crown 12 of projections has eight such projections in the embodiment of FIGS. 6 and 7 of the drawings whereas, it will be remembered, each assembly or crown 12 has only six projections in the embodiment of FIGS. 1 to 5. As a consequence, each of the eight projections in each assembly or crown 12 in the roller of FIGS. 6 and 7 of the drawings is spaced angularly from each of its neighbors about the roller axis a by $22\frac{1}{2}°$ instead of 30° in the case of the embodiment of FIGS. 1 to 5 of the drawings. Once again, each crown or assembly 12 of projections is staggered angularly around the axis a from the or each neighboring assembly or crown 12 along the axial length of the roller so that, viewed lengthwise of the axis a (FIG. 7), half the number of projections (i.e. four) of one assembly or crown 12 will appear to be located between the two projections of an integral pair of a neighboring assembly or crown 12. This relationship is clearly illustrated in FIG. 7 of the drawings. Scraping members 27 are provided to scrape the curved surface of the shaft or carrier 26 between the assemblies or crowns 12 and it will be seen from the drawings that said scraping members 27 differ from the previously described scraping members 15 only in that they are of greater axial length in directions parallel to the axis a and in that their supports, including the beam 17, are deployed in a somewhat different manner. Owing to the greater length of each scraping member 27, as compared with the scraping members 15, there are only relatively narrow gaps between the neighboring ends of those scraping members 27 which gaps, of course, register with the assemblies or crowns 12 of projections which pass between them when the roller is revolving in the direction B.

It is preferred that the shaft or carrier 26 of the roller of FIGS. 6 and 7 of the drawings should have a diameter of not less than twenty-five centimeters and, in the example that is illustrated in FIGS. 6 and 7, it has a diameter of substantially thirty centimeters. The preferred overall diameter of the roller of FIGS. 6 and 7 of the drawings (including its projections) is advantageously substantially fifty-five centimeters and, in the illustrated example, it is fifty centimeters. A soil cultivating implement having one of the rollers that has been described, and particularly the roller of FIGS. 6 and 7 of the drawings which has the larger diameter shaft or carrier 26, has been found to be very effective in paddy fields and other fields where crops are to be grown under substantially continuously wet conditions. The roller satisfactorily consolidates the soil in such situations and, if there is a tendency for the tubular shaft or carrier of the roller to consolidate the soil to an excessive extent, the laterally bent-over end portions 14 of the projections counteract that tendency and re-loosen the soil.

Although various features of the soil cultivating implement embodiments described and illustrated in the accompanying drawings will be set forth in the following claims as inventive features, the invention is not necessarily limited to those features and that it includes within its scope other inventive features of each soil cultivating implement embodiment described or illustrated or both in the accompanying drawings, both individually and in various combinations.

Having disclosed our invention, what we claim as new and secure by Letters Patent of the United States is:

1. A rotary harrow including a frame and soil working means comprising a plurality of soil working members arranged in a transverse row, said members being rotatable about upwardly extending axes defined by respective shafts journalled in a transverse frame portion, a supporting roller being connected to the frame and positioned at the rear of said soil working members, said roller being pivotably interconnected to said frame portion via arms with adjusting means to support the frame portion and said arms being adjustable to a number of fixed positions to preselect the working depth of the soil working members, said roller comprising assemblies of outwardly extending projections mounted along the length of an elongated central carrier and said projections comprising integral portions that are angled to one another, said projections terminating in outer free ends which increase in width in substantially the direction of said roller's working direction of movement as they extend outwardly and said ends being bent over laterall from adjacent portions to increase the support of said roller on the ground during operation, said ends also being inclined relative to planes perpendicular to the axis of roller rotation, the end portions of successive projections around the surface of the carrier being bent over laterally in relatively opposite directions.

2. An implement as claimed in claim 1, wherein each end portion is bent over laterally relative to said plane to be inclined to that plane at an angle of between about 45° to 50°.

3. An implement as claimed in claim 1, wherein each end portion has a length substantially one-quarter of the total length of that projection.

4. An implement as claimed in claim 1, wherein each end portion has a flattened part throughout at least part of its length which becomes progressively wider in a direction towards said free end.

5. An implement as claimed in claim 1, wherein each end portion is bent over rearwardly with respect to the normal direction of rotation of said roller.

6. An implement as claimed in claim 5, wherein each end portion is bent over rearwardly at an angle of about 30° relative to a line that extends radially from the axis of roller rotation.

7. An implement as claimed in claim 1, wherein said projections are arranged in assemblies or crowns and each crown comprises a plurality of integral pairs of rod or bar projections.

8. An implement as claimed in claim 7, wherein the two projections of an integral pair form relatively inclined limbs of a generally U-shaped figure, said pair being secured to the outer surface of said carrier.

9. An implement as claimed in claim 8, wherein the two projections of said one integral pair are inclined to one another at an angle of about 60°.

10. An implement as claimed in claim 7, wherein the projections of neighboring crowns along the axial length of the roller are angularly staggered about the axis of roller rotation by an angle of about 30°, the free ends of projections in the successive crowns being interconnected by imaginary helical lines extending around said axis of rotation.

11. An implement as claimed in claim 10, wherein each imaginary helical line interconnects the extremities of the end portions of those projections that are bent over laterally in the same direction.

12. An implement as claimed in claim 7, wherein said projections are rods of circular cross-section.

13. An implement as claimed in claim 7, wherein scraping members are positioned between immediately neighboring crowns of projections.

14. An implement as claimed in claim 13, wherein the scraping members are arranged substantially centrally between the successively neighboring crowns of projections.

15. A rotary harrow including a frame and soil working means, said soil working means comprising a plurality of soil working members arranged in a transverse row, said members being rotatable about upwardly extending axes defined by respective shafts journalled in a transverse frame portion, a supporting roller being connected to the frame and positioned at the rear of said soil working members, said roller being pivotably interconnected to said frame portion via arms with adjusting means to support the frame portion and said arms being adjustable to a number of fixed positions to preselect the working depth of the soil working members, said roller comprising assemblies of outwardly extending projections mounted along the length of an elongated central carrier and said projections comprising integral portions that are angled to one another, neighboring assemblies being angularly staggered around said carrier and scraping means being located between neighboring assemblies, said projections terminating in outer free ends which are elongated substantially parallel to their direction of rotation as seen in plan view and said ends being bent over laterally from adjacent portions to increase the support of said roller on the ground during operation, said ends also being inclined to planes perpendicular to the axis of roller rotation.

* * * * *